United States Patent Office 3,787,514
Patented Jan. 22, 1974

3,787,514
CATALYSTS FOR SELECTIVE HYDROGENATION OF HYDROCARBONS
Philippe Bernusset, Rue Maurice Fournier, Salindres, France
No Drawing. Continuation-in-part of abandoned application Ser. No. 52,727, July 6, 1970. This application July 19, 1972, Ser. No. 273,328
Int. Cl. C07c 11/00
U.S. Cl. 260—677 H                8 Claims

ABSTRACT OF THE DISCLOSURE

The removal of unsaturated impurities in the purification of ethylenic gases by selective hydrogenation with a catalyst of palladium having an addition of vanadium as a promoter.

---

This is a continuation-in-part of copending application Ser. No. 52,727, now abandoned, filed July 6, 1970.

This invention relates to palladium supported catalysts intended for use in purification of ethylenic hydrocarbons by selective hydrogenation of their unsaturated impurities.

For use without difficulties in various industrial operations, it is known that from the ethylenic hydrocarbons, more particularly ethylene, must be removed as much as possible from other unsaturated hydrocarbon impurities such as acetylenic and diethylenic hydrocarbons (i.e., diolefins).

It has been recommended for some time to achieve this purification by selective hydrogenation of these impurities, either on the gases obtained by pyrolysis of hydrocarbons originating from raw mineral oils, or on such gases from which certain undesirable components, such as methane, have previously been eliminated. This selective hydrogenation, when employed in the cycle of manufacture, is a delicate operation that is achieved only by means of a catalyst having a carefully limited activity.

With regard to the selective hydrogenation of the unsaturated impurities contained in the ethylenic gases from which methane and other gases have previously been removed, initially it has been recommended to make use of palladium catalysts, the activity of which is regulated by an accurate determination of the palladium content and characteristics of the support.

The increasing requirements concerning the purity of the ethylenic hydrocarbons, particularly with respect to their use in the preparation of high grade polymers, have led to the development of catalysts the activity of which is more specific in a wide temperature range in order to provide for industrial use. Furthermore, their duration should be as long as possible in order to attain these various purposes. As additions to palladium catalysts, various metallic materials have been recommended, such for example as silver, copper, gold, iron, chromium, rhodium, ruthenium and molybdenum.

It is an object of this invention to provide a new and improved catalytic system based upon palladium on a specific support for use in selective hydrogenation of unsaturated impurities in the purification of ethylenic hydrocarbons.

In accordance with the practice of this invention, a formulated palladium catalyst is provided on various supports having a small specific surface whereby markedly superior results are secured which are capable of industrial application, the selectivity of the catalysts being regulated principally by the addition of vanadium as a promoter.

In accordance with the practice of the invention, the catalyst is formulated with a palladium content within the range of 100 to 800 p.p.m. and with the vanadium content present within the range of 50 to 1000 p.p.m. and in which the catalyst is carried on a support preferably in the form of alumina or of silica and alumina, having specific surfaces within the range of a few $m.^2/g.$ to 150 $m.^2/g.$ The catalysts formulated in accordance with the practice of this invention are characterized by a fairly low starting temperature for the reaction of hydrogenation of unsaturated impurities such as acetylenic hydrocarbons and diolefins and a sufficiently high temperature at which the reaction ceases thereby to provide as low as possible the rate of destruction of the ethylenic hydrocarbons by hydrogenation during the working interval notwithstanding the rise in temperature during the reaction. Furthermore, the disadvantages resulting from the fixation of polymers of acetylene on the catalyst is minimized, this evidently being a factor promoting the extended use of the catalysts without re-generation.

It stands to reason that the conventional processes for preparation of the catalysts comprising a support and various catalytic materials can be used in the present application. Nevertheless, in the preferred process, the support is impregnated by means of solutions of compounds yielding the catalytic materials of this invention by calcination, such impregnation being carried out in one or a number of steps.

In commercial practice, the catalysts of the present invention can be used in a pressure range extending from a few bars to about 40 bars and at a reaction temperature within the range of 40° to 150° C. for purifying gases containing acetylene in amounts within the range of 0.3 to 1.2 mole percent. Under these conditions, the gas volume to be treated per volume of catalyst per hour (v./v./h.) may go as high as $4000^{h-1}$, the molar ratio between the required hydrogen and the amount of acetylene being within the range of 1.8 to 3.5. However, it is possible further to increase the rate of flow of the gases to be treated to as much as $6000^{h-1}$ for gases having an acetylene content above 1.2 mole percent, the entire elimination of the acetylene being achieved in two stages.

The following examples are given by way of illustration, and not by way of limitation, of the practice of this invention:

The examples are given to compare results of selective hydrogenation of a gaseous mixture containing ethylene and traces of acetylene for various compositions of catalysts corresponding to the formulae of the present invention and for previously known catalyst compositions, either palladium alone or palladium and of recently recommended additions of molybdenum.

All of these tests were carried out under the following general conditions:

pressure of gases: 24 bars
flow rate of gases per volume of catalyst (v./v./h.) $2700^{h-1}$ The comparative results given relate to one or more of the following measurements: $T_1$ is the starting temperature of the reaction, $T_2$ is the temperature at which the acetylene begins to appear, and $\Delta T$ is the temperature range for which the output of the acetylene conversion is practically 100%, that is to say, the temperature range for which less than 1 p.p.m. of acetylene remains in the gases. It will be noticed that this $\Delta T$ range is smaller than the interval existing between the temperatures $T_2$ and $T_1$.

EXAMPLE 1

The catalysts of this example were prepared on alumina grains having a specific surface of 5 $m.^2/g.$ and a porous volume of 0.45 $cm.^3/g.$ The catalyst A, representing the formulae of this invention, is obtained by impregnating 100 grams of the alumina with 45 ml. of a solution resulting from the reduction to this volume of a mixture of a solution containing 0.046 g. of ammonium metavanadate and 8.45 ml. of a nitric acid solution of palladium nitrate containing 29.65 g. per liter which has been diluted five-fold. The impregnated carrier is dried at 120° C. and then calcined for three hours at 450° C.

The catalyst B, for comparison, is obtained in the same manner but without the ammonium metavanadate in the impregnation solution. Both of these final catalysts contain about 500 p.p.m. of palladium, with catalyst A containing 200 p.p.m. of vanadium in addition.

The conditions of tests of both of these catalysts and the results obtained are set forth in the following table:

TABLE I

| | Conditions | |
|---|---|---|
| | 0.8% of $C_2H_2$ | $H_2/C_2H_2=3.1$ |
| | $T_2$, ° C. | $\Delta T$ ° C. |
| Catalyst: | | |
| A | 110 | 30 |
| B | 90 | 25 |

This example shows the exceptional activity resulting from the presence of the vanadium with the palladium. The catalyst A can operate at a temperature definitely higher than that of catalyst B and with the working interval being substantially greater.

EXAMPLE 2

The three catalysts of this example were prepared on alumina supports containing bentonite having a derived silica content of 5% by weight. The specific surface of the support is 7 $m.^2/g.$ and the porous volume is 0.35 $cm.^3/g.$ The impregnation is achieved in the same manner described in the preceding example, in such a way that the catalysts contain 300 p.p.m. of palladium, with catalyst A containing 600 p.p.m. of vanadium in addition and catalyst B containing 600 p.p.m. of molybdenum. The operating conditions and the results obtained are set forth in the following table:

TABLE II

| | Conditions | | |
|---|---|---|---|
| | 0.8% of $C_2H_2$ | | $H_2/C_2H_2=2.3$ |
| | $T_1$ ° C. | $T_2$ ° C. | $\Delta T$ ° C. |
| Catalyst: | | | |
| A | 55 | 121 | 52 |
| B | 50 | 96 | 27 |
| C | 59 | 112 | 33 |

The results show the superiority of the catalyst A containing the vanadium in that the starting temperature for this catalyst is slightly higher than that of catalyst B whereas the temperature at which reaction ceases is much higher. Moreover, the formula of the catalyst C, representing the prior art, gives results inferior to those of catalyst A although slightly better than that of catalyst B.

EXAMPLE 3

In the same general manner as in the preceding examples, two catalysts A and B were prepared on an alumina support having a specific surface of 99 $m.^2/g.$ and a porous volume of 0.56 $cm.^3/g.$ The catalyst A contains 500 p.p.m. of palladium and the catalyst B contains 300 p.p.m. of palladium and 300 p.p.m. of vanadium. With both of these catalysts, measurements were made only of the temperature $T_2$ of the reaction.

The operating conditions and the resuls obtained are set forth in the following table:

TABLE III

Conditions: 0.7% of $C_2H_2$, $H_2/C_2H_2=2.9$

| Catalysts: | $T_2$ ° C. |
|---|---|
| A | 106 |
| B | 120 |

It will be seen that the catalyst B gives higher temperature for ceasing the reaction than catalyst A.

EXAMPLE 4

In the same manner as in the preceding examples, three catalysts were prepared on a support of alumina and silica, which silica was provided by 5% of bentonite. The specific surface of the support is 8 $m.^2/g.$ and the porous volume is 0.35 $cm.^3/g.$ Catalyst A contains 300 p.p.m. of palladium; catalyst B contains 300 p.p.m. of palladium and 300 p.p.m. of vanadium, and catayst C contains 300 p.p.m. of palladium and 700 p.p.m. of vanadium. Measurements were made of the ceasing temperature $T_2$ of the reaction and the $\Delta T$ interval of temperatures gave an acetylene conversion of 100%.

The operating conditions and the results are set forth in the following table:

TABLE IV

| | Conditions | |
|---|---|---|
| | 0.7% of $C_2H_2$ | $H_2/C_2H_2=1.8$ |
| | $T_2$ ° C. | $\Delta T$ ° C. |
| Catalyst: | | |
| A | 82 | 27 |
| B | 108 | 45 |
| C | 119 | 50 |

These results show the activity resulting from an increasing proportion of vanadium since the catalyst B gives an interval $\Delta T$ higher than that of catalyst A. The increase in vanadium content of the catalyst C also gives an additional gain in the length of this interval.

EXAMPLE 5

This example illustrates the hydrogenation of a gaseous mixture of propylene and traces of propadiene and methyl acetylene, which is carried out using a pressure of 24 bars and a volumetric flow rate based upon the volume of the catalysts (v./v./h.) of $1200^{h-1}$.

The feed gas in each test is propylene which contains 2% methyl acetylene and 1% propadiene; the molar ratio of $H_2/C_3H_4$ is 25.

The temperature $T_1$ represents the temperature at which the reaction commences and $T_2$ represents the temperature at which methyl acetylene and propadiene begin to appear in the output gas stream. $\Delta T$ is the temperature interval for which the conversion of propadiene and methyl acetylene is near 100% (i.e., the temperature interval for which the level of propadiene and methyl acetylene in the output gas stream is less than 5 p.p.m.).

The catalysts used in this example are prepared using the procedure described in Example 2. Catalyst A contains 300 p.p.m. of palladium, catalyst B contains 300 p.p.m. palladium and 600 p.p.m. vanadium (in the form of an oxide), and catalyst C contains 300 p.p.m. palladium and 360 p.p.m. chromium (in the form of an oxide).

The results of these tests are shown in the following table:

TABLE V

| | $T_1$ (° C.) | $T_2$ (° C.) | $\Delta T$ (° C.) |
|---|---|---|---|
| Catalyst: | | | |
| A | 70 | 120 | 20 |
| B | 75 | 160 | 45 |
| C | 80 | 150 | 33 |

These results, like those of the preceding examples, demonstrate the superiority of catalyst B of the invention which contains Pd and V. Catalyst C of the prior art, while providing results superior to catalyst A, yields results which are inferior to those using catalyst B.

The preceding examples are given to show the efficient activity of vanadium when employed in combination with palladium. The invention is not to be limited to catalysts containing only vanadium as the selectivity promoter.

It is possible to add certain other promoters such as iron, cobalt, nickel, copper, silver, gold, chromium, molybdenum, tungsten, ruthenium, rhodium and rare earth metals, in accordance with the practice of the invention.

It will be understood that changes may be made in the details of formulation and operation without departing from the spirit of the invention, especially as defined in the following claims.

I claim:

1. Catalysts for selective hydrogenation of unsaturated impurities in ethylenic gases in which the catalyst consists essentially of from 100 to 800 parts per million of palladium metal and 50 to 1000 parts per million of a vanadium oxide deposited on a support selected from the group consisting of alumina and alumina and silica having a specific surface area of up to 150 m.$^2$/g.

2. The process of purification of ethylene gases by removal of acetylene comprising the step of selective hydrogenation of the acetylene with a catalyst claimed in claim 1 at a temperature of 40 to 150° C. and a pressure up to 40 bars.

3. The process as claimed in claim 2 in which the selective hydrogenation is carried out at a pressure within the range of a few bars and at a temperature within the range of 40° to 150° C., when the acetylene is present in an amount above 1.2 mole percent and in which the volume of gas treated per volume of catalyst per hour is up to 6000$^{h-1}$.

4. The process as defined in claim 2 wherein the acetylene is present in the ethylene gas in an amount within the range of 0.3 to 1.2 mole percent, and the molar ratio between the hydrogen and the acetylene is within the range of 1.8 to 3.5 and the volume of gas treated per volume of catalyst per hour is up to 400$^{h-1}$.

5. The process of purification of ethylenic hydrocarbon gases by removal of acetylenic and diolefinic hydrocarbons comprising the step of selective hydrogenation of the acetylenic or diolefinic hydrocarbon with a catalyst claimed in claim 1 at a temperature of 40 to 150° C. and a pressure up to 40 bars.

6. The process as claimed in claim 5 wherein the ethylenic hydrocarbon is selected from the group consisting of ethylene and propylene.

7. The process as claimed in claim 5 wherein the acetylenic and diolefinic hydrocarbons are selected from the group consisting of acetylene, methyl acetylene, propadiene and mixtures thereof.

8. The process as claimed in claim 5 wherein the volume of gas treated per volume of catalyst per hour is up to 600$^{h-1}$.

References Cited
UNITED STATES PATENTS

| | | | |
|---|---|---|---|
| 3,116,342 | 12/1963 | Robinson et al. | 260—677 H |
| 3,412,169 | 11/1968 | Clark | 260—677 H |
| 3,549,720 | 12/1970 | Wright et al. | 260—677 |
| 3,674,888 | 7/1972 | Derrien et al. | 260—677 H |
| 3,207,703 | 9/1965 | Innes et al. | 252—455 |

DELBERT E. GANTZ, Primary Examiner

J. M. NELSON, Assistant Examiner

U.S. Cl. X.R.

260—683.9; 208—255; 252—464, 456